(12) United States Patent
Wolf et al.

(10) Patent No.: US 12,409,738 B2
(45) Date of Patent: Sep. 9, 2025

(54) PULSED TORQUE COMMAND WITH ADJUSTABLE MAGNITUDE FOR ELECTRIC MACHINE TORQUE CONTROL

(71) Applicant: Ford Global Technologies, LLC, Dearborn, MI (US)

(72) Inventors: Chris Wolf, Ann Arbor, MI (US); Michael W. Degner, Novi, MI (US); Yue Nie, Ann Arbor, MI (US); Monty Anderson, Boise, ID (US)

(73) Assignee: Ford Global Technologies, LLC, Dearborn, MI (US)

( * ) Notice: Subject to any disclaimer, the term of this patent is extended or adjusted under 35 U.S.C. 154(b) by 327 days.

(21) Appl. No.: 18/164,890

(22) Filed: Feb. 6, 2023

(65) Prior Publication Data

US 2024/0262217 A1    Aug. 8, 2024

(51) Int. Cl.
*B60L 15/08*     (2006.01)
*B60L 15/20*     (2006.01)

(52) U.S. Cl.
CPC ........... *B60L 15/2045* (2013.01); *B60L 15/08* (2013.01); *B60L 2240/423* (2013.01); *B60L 2250/26* (2013.01); *B60L 2260/40* (2013.01)

(58) Field of Classification Search
CPC ................ B60L 15/2045; B60L 15/08; B60L 2240/423; B60L 2250/26; B60L 2260/40; B60L 15/20
See application file for complete search history.

(56) References Cited

U.S. PATENT DOCUMENTS

| | | |
|---|---|---|
| 4,724,366 A | 2/1988 | Neesz |
| 10,483,900 B2 | 11/2019 | Park et al. |
| 10,944,352 B2 | 3/2021 | Mazda et al. |
| 11,088,644 B1 | 8/2021 | Carvell |
| 11,345,241 B1 | 5/2022 | Cai |
| 2021/0146909 A1* | 5/2021 | Serrano .................... H02P 27/16 |
| 2022/0094290 A1* | 3/2022 | Carvell .................... H02P 23/04 |
| 2022/0294368 A1* | 9/2022 | Phillips .................... H02P 23/02 |
| 2023/0011334 A1* | 1/2023 | Arvanitis ................. H02P 21/02 |
| 2023/0114289 A1* | 4/2023 | Islam ........................ H02P 5/74 |
| | | 318/53 |

FOREIGN PATENT DOCUMENTS

CN            114157213 A        3/2022

\* cited by examiner

*Primary Examiner* — Calvin Cheung
(74) *Attorney, Agent, or Firm* — David Kelley; McCoy Russell LLP

(57) ABSTRACT

Systems and methods for commanding an electric drive system for an electric or hybrid vehicle are described. In one example, the drive system is commanded by a controller that supplies a pulsed torque command that varies in magnitude as a function of time when a driver of a vehicle requests a constant driver demand torque.

16 Claims, 12 Drawing Sheets

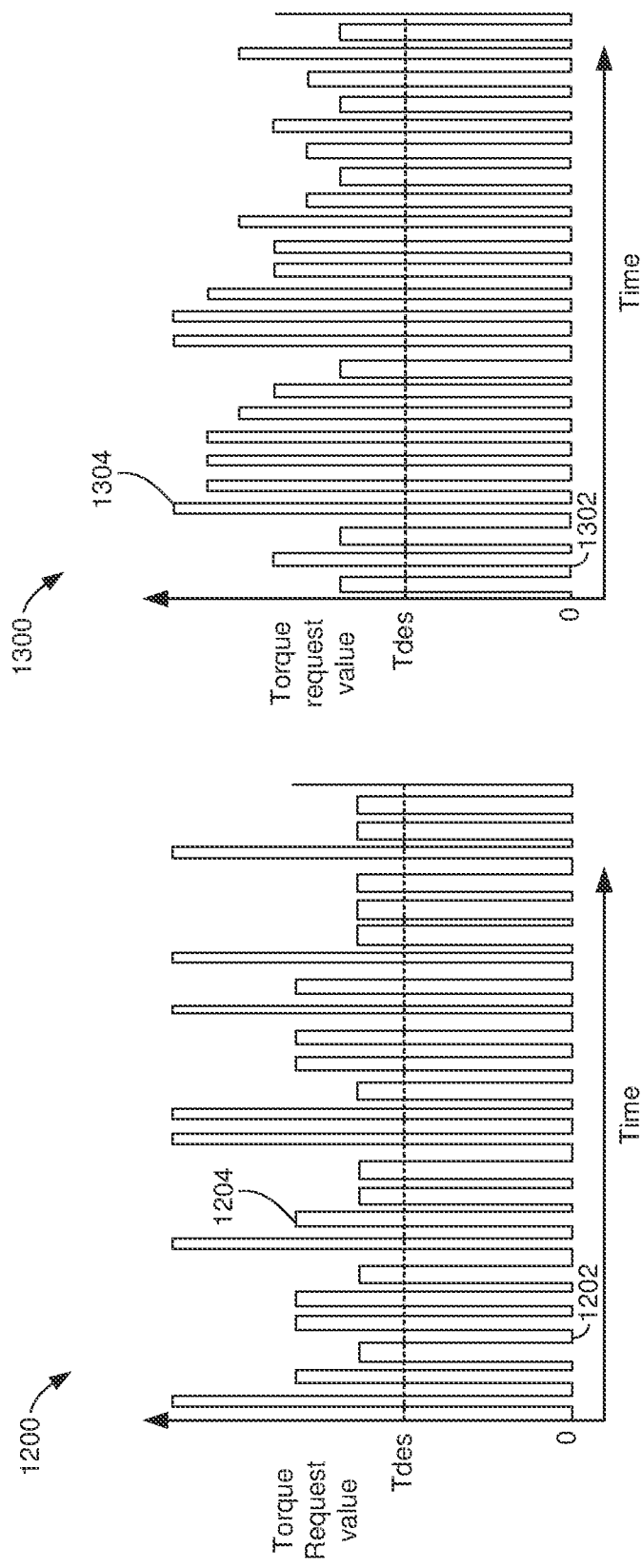

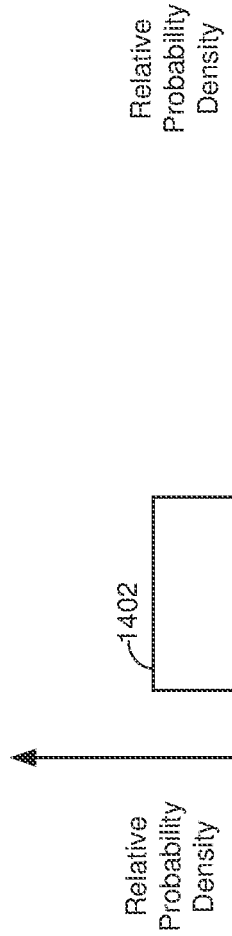
FIG. 14
FIG. 15
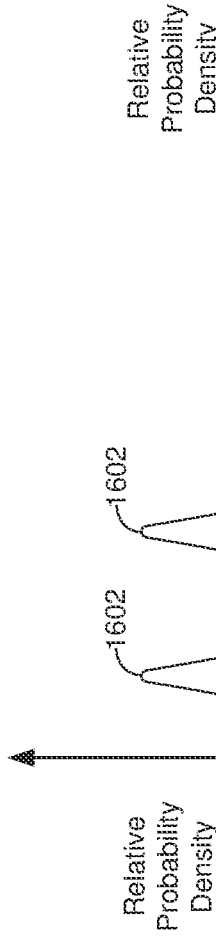
FIG. 16
FIG. 17

PULSED TORQUE COMMAND WITH ADJUSTABLE MAGNITUDE FOR ELECTRIC MACHINE TORQUE CONTROL

FIELD

The present description relates to methods and a system for controlling torque of an electric machine.

BACKGROUND

Losses of an electric machine may increase as torque generated by the electric machine increases. The electric machine losses may increase non-linearly as torque increases, but the electric machine losses may be greater at lower level electric machine torque output levels than may be expected due to inverter switching. Electric machines that operate in electric vehicles to provide propulsive effort may often operate at lower torque output levels. In addition, it may be desirable to convert electrical energy into propulsive force as efficiently as possible so that vehicle range may be extended and vehicle operating expenses may be lowered. Therefore, it may be desirable to provide a way of increasing electric machine efficiency when the electric machine is operating at low torque output levels.

The inventors herein have recognized the above-mentioned issues and have developed a method for operating an electric drive system, comprising: generating a pulsed torque request that includes pulses of torque with at least two different magnitudes in response to a constant driver demand torque request; and generating a torque that on average corresponds to the constant driver demand torque request via an electric machine in response to the pulsed torque request.

By generating a pulsed torque command or signal that varies in magnitude with at least two different torque request magnitudes in response to a constant driver demand torque request, it may be possible to reduce losses of an electric drive system while maintaining a lower level of noise and vibration as compared to operating the electric drive system based on a pulsed torque command that does not vary in torque magnitude in response to a constant driver demand torque request.

The present description may provide several advantages. In particular, the approach may provide smoother torque generation and lowered electric drive system losses. Further, the approach may reduce torque ripple and radial electromagnetic forces in the electric machine. Further still, the approach may be applied in different ways in different applications so that noise and vibration requirements of the different applications may be met.

The above advantages and other advantages, and features of the present description will be readily apparent from the following Detailed Description when taken alone or in connection with the accompanying drawings.

The summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 4-21 show plots of ways that a pulsed torque command may be adjusted as a function of time while torque output of an electric machine that is commanded to follow the pulsed torque command meets a driver demand torque;

DETAILED DESCRIPTION

Figure 1:
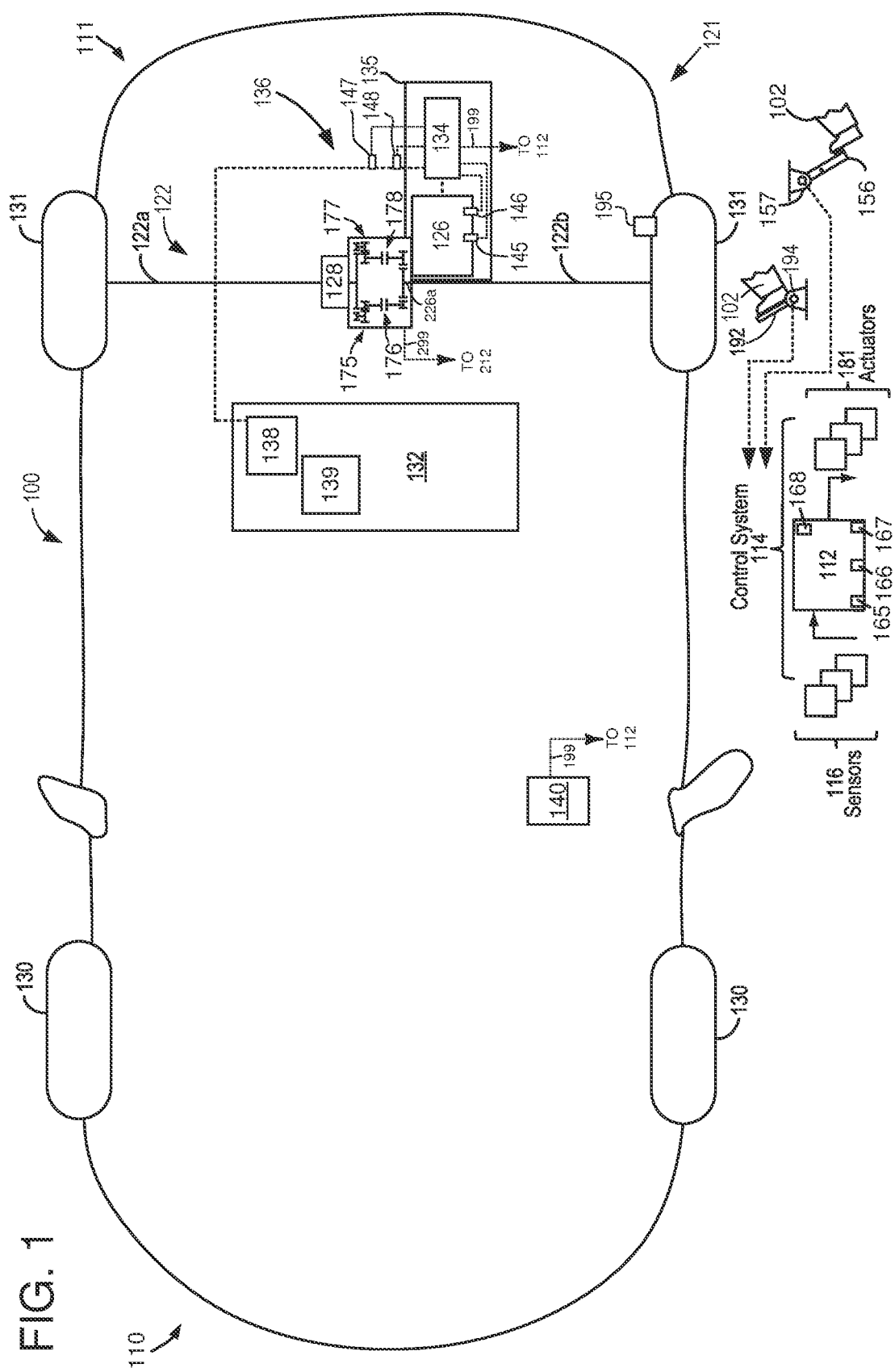
FIG. 1 is a schematic diagram of a vehicle that includes an electric machine for propulsion.
Figure 22:
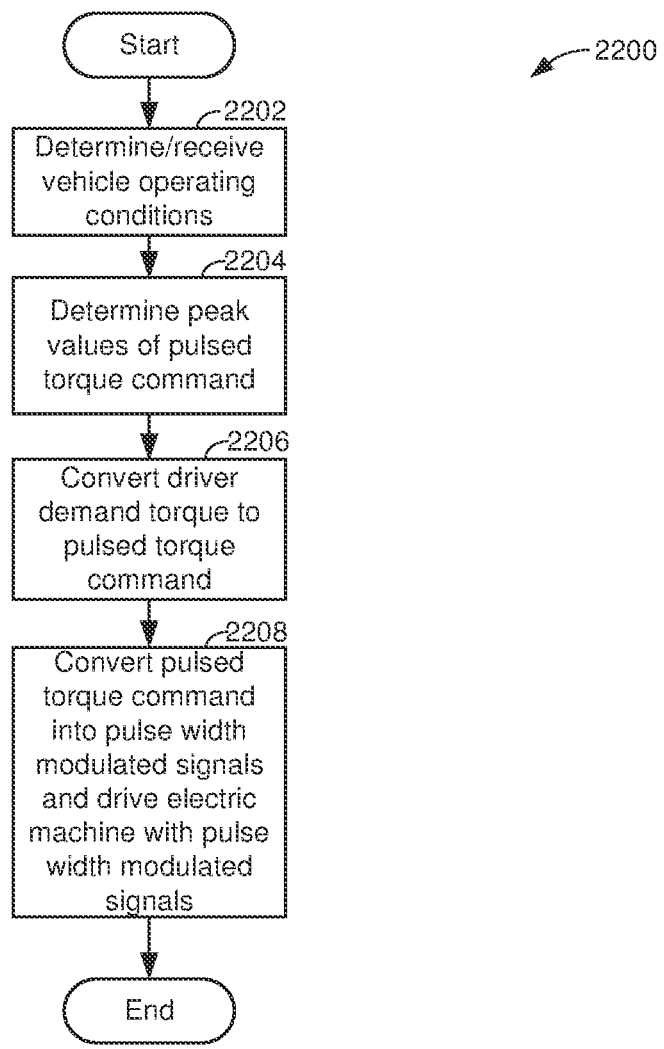
FIG. 22 shows a method for generating pulsed torque commands for operating an electric machine.
Figure 23:
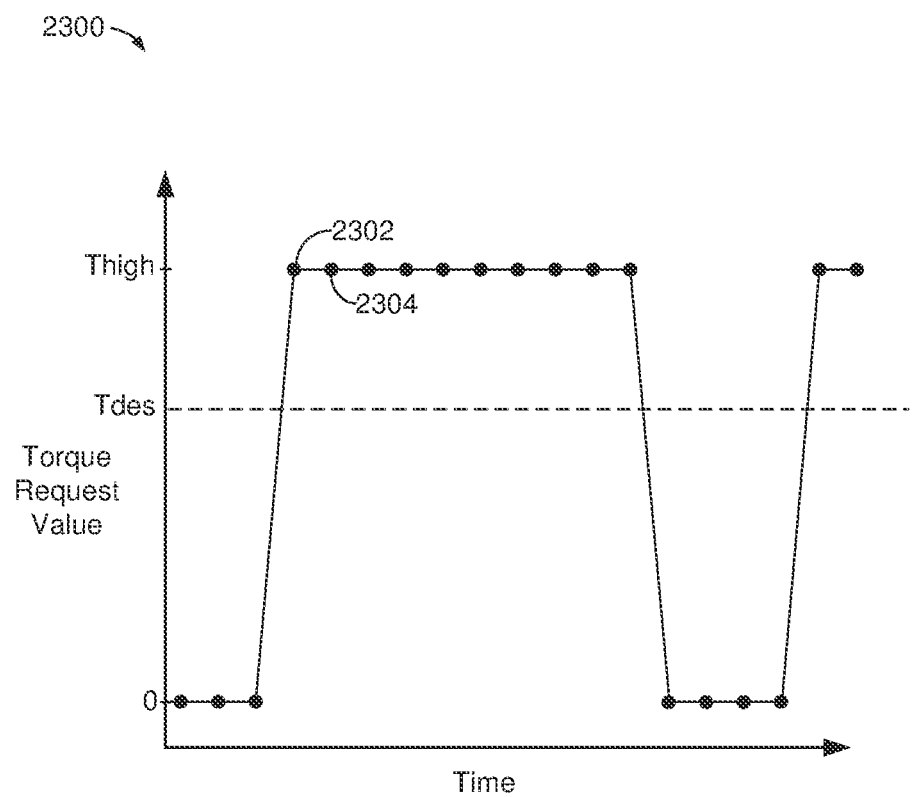
FIG. 23 shows a detailed view of a pulsed torque command.

The present description is related to improving efficiency of an electric drive system that includes an electric machine. The efficiency of the electric drive system may be improved by commanding the electric drive system via a pulsed torque command signal. The pulsed torque command signal may be output by a controller at lower driver demand torques to improve electric drive system efficiency. The pulsed torque command signal may be applied in a vehicle of the type that is shown in FIG. 1. The pulsed torque command signal may be generated via a controller and input to an electric drive system as shown in the block diagram of FIG. 2. The pulsed torque command may be applied to the electric drive system in a low torque operating region as shown in FIG. 3. FIGS. 4-21 show how magnitudes of a pulsed torque command signal may be varied while meeting driver demand torque and noise and vibration metrics. FIG. 22 shows a flowchart of a method for generating a pulsed torque command signal. Finally, FIG. 23 shows a detailed view of a portion of a pulsed torque request.

FIG. 1 is a schematic diagram of a vehicle 121 including a powertrain or vehicle propulsion system 100. A front portion of vehicle 121 is indicated at 110 and a rear portion of vehicle 121 is indicated at 111. Vehicle propulsion system 100 includes electric machine 126. Electric machine 126 may consume or generate electrical power depending on its operating mode. Throughout FIG. 1, mechanical connections between various components are illustrated as solid lines, whereas electrical connections between various components are illustrated as dashed lines.

Vehicle propulsion system 100 has a rear axle 122. In some examples, rear axle 122 may comprise two half shafts, for example first half shaft 122a, and second half shaft 122b. Vehicle propulsion system 100 further has front wheels 130 and rear wheels 131. Rear wheels 131 may be driven via electric machine 126.

The rear axle 122 is coupled to electric machine 126. Rear drive unit 136 may transfer power from electric machine 126 to axle 122 resulting in rotation of rear wheels 131. Rear drive unit 136 may include a low gear 175 and a high gear 177 that are coupled to electric machine 126 via output shaft 126a of electric machine 126. Low gear 175 may be engaged via fully closing low gear clutch 176. High gear 177 may be engaged via fully closing high gear clutch 178. High gear clutch 178 and low gear clutch 176 may be opened and closed via commands received by rear drive unit 136 over controller area network (CAN) 199. Alternatively, high gear clutch 178 and low gear clutch 176 may be opened and closed via digital outputs or pulse widths provided via control system 114. Rear drive unit 136 may include differential 128 so that torque may be provided to first half shaft 122a and to second half shaft 122b. In some examples, an electrically controlled differential clutch (not shown) may be included in rear drive unit 136.

Electric machine 126 may receive electrical power from onboard electrical energy storage device 132. Furthermore, electric machine 126 may provide a generator function to convert the vehicle's kinetic energy into electrical energy, where the electrical energy may be stored at electric energy storage device 132 for later use by electric machine 126. An inverter system controller (ISC1) 134 may convert alternating current generated by electric machine 126 to direct current for storage at the electric energy storage device 132 and vice versa. Electric drive system 135 includes electric machine 126 and inverter system controller 134. Inverter system controller may include a microcontroller, memory (e.g., random-access memory and read-only memory), and input/output circuitry (not shown). Electric energy storage device 132 may be a battery, capacitor, inductor, or other electric energy storage device. Electric power flowing into electric drive system 135 may be monitored via current sensor 145 and voltage sensor 146. Position and speed of electric machine 126 may be monitored via position sensor 147. Torque generated by electric machine 126 may be monitored via torque sensor 148.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 114 may communicate with electric machine 126, energy storage device 132, inverter system controller 134, etc. Control system 114 may receive sensory feedback information from electric drive system 135 and energy storage device 132, etc. Further, control system 114 may send control signals to electric drive system 135 and energy storage device 132, etc., responsive to this sensory feedback. Control system 114 may receive an indication of an operator requested output of the vehicle propulsion system from a human operator 102, or an autonomous controller. For example, control system 114 may receive sensory feedback from driver demand pedal position sensor 194 which communicates with driver demand pedal 192. Pedal 192 may refer schematically to a driver demand pedal. Similarly, control system 114 may receive an indication of an operator requested vehicle braking via a human operator 102, or an autonomous controller. For example, control system 114 may receive sensory feedback from brake pedal position sensor 157 which communicates with brake pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to electric energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 112). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Controller 112 may comprise a portion of a control system 114. In some examples, controller 112 may be a single controller of the vehicle. Control system 114 is shown receiving information from a plurality of sensors 116 (various examples of which are described herein) and sending control signals to a plurality of actuators 181 (various examples of which are described herein). As one example, sensors 116 may include tire pressure sensor(s) (not shown), wheel speed sensor(s) 195, etc. In some examples, sensors associated with electric machine 126, wheel speed sensor 195, etc., may communicate information to controller 112, regarding various states of electric machine operation. Controller 112 includes non-transitory (e.g., read only memory) 165, random access memory 166, digital inputs/outputs 168, and a microcontroller 167. Controller 112 may receive input data and provide data to human/machine interface 140 via CAN 199. Controller 112 may be a controller that is additional to inverter system controller 134, or alternatively, it may be a controller that is part of inverter system controller 134.

Thus, the system of FIG. 1 provides for a system, comprising: an electric drive system including an inverter and an electric machine; and a controller including executable instructions stored in non-transitory memory that cause the controller to generate a pulsed torque request that varies maximum magnitudes of torque pulses in the pulsed torque request as a function of time in response to a constant driver demand torque request. In a first example, the system includes where the torque pulses increase from a first torque value to torque values greater than a second torque value, and where the second torque value is greater than the constant driver demand torque request. In a second example that may include the first example, the system includes where the torque pulses return to the first torque value after reaching the torque values greater than the second torque value. In a third example that may include one or both of the first and second examples, the system includes where the maximum magnitudes of torque pulses are randomly selected from a group of predetermined values. In a fourth example that may include one or more of the first through third examples, the system includes where the maximum magnitudes of torque pulses are randomly selected from a range of predetermined values. In a fifth example that may include one or more of the first through fourth examples, the system includes where the electric drive system generates a torque to propel a vehicle in response to the pulsed torque request. In a sixth example that may include one or more of the first through fifth examples, the system further comprises additional executable instructions that cause the controller to adjust a probability of torque values to vary maximum magnitudes of the torque pulses.

Figure 2:
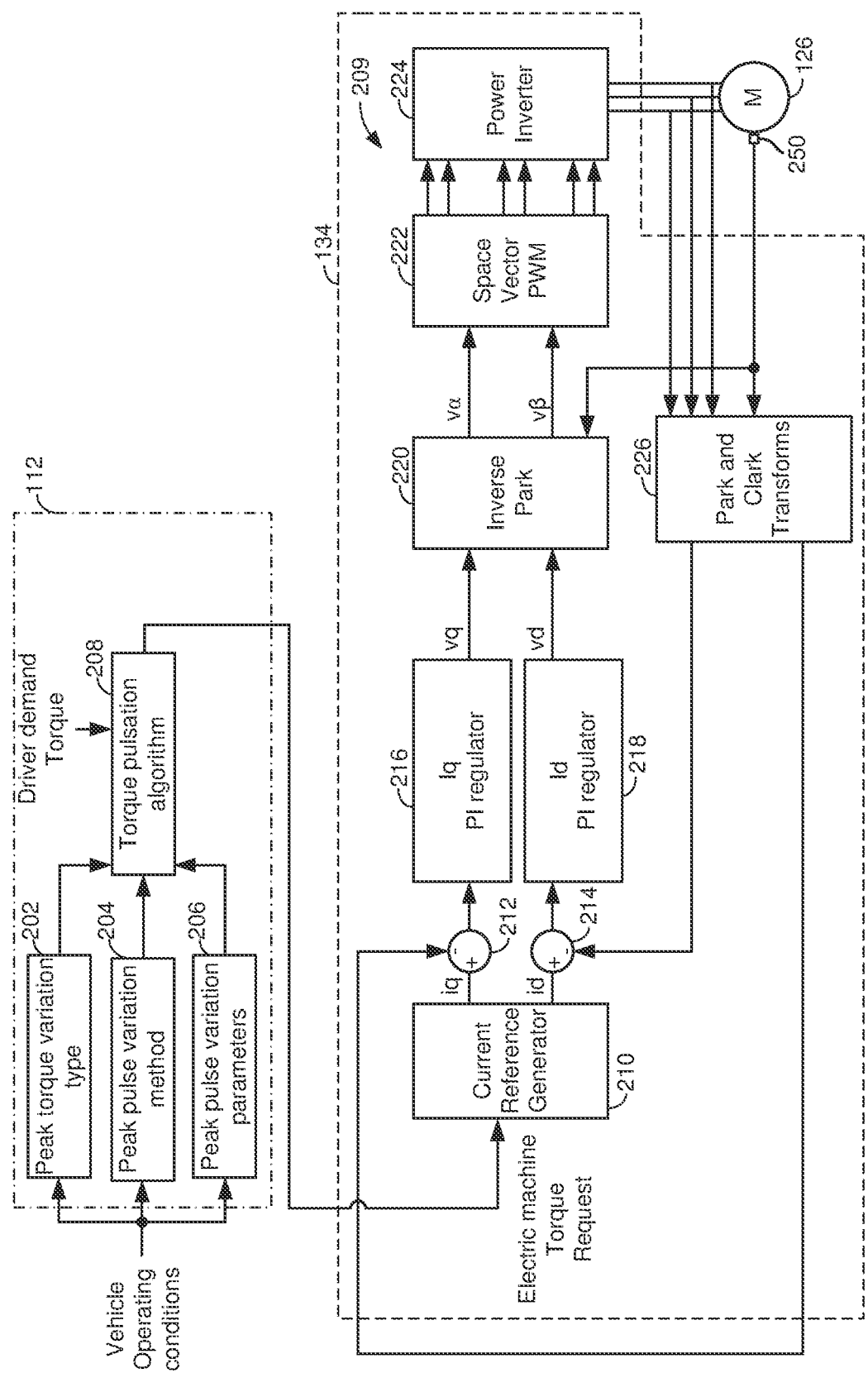
FIG. 2 is a block diagram of a controller that supplies a pulsed torque signal to an electric drive system that includes an electric machine.
Figure 3:
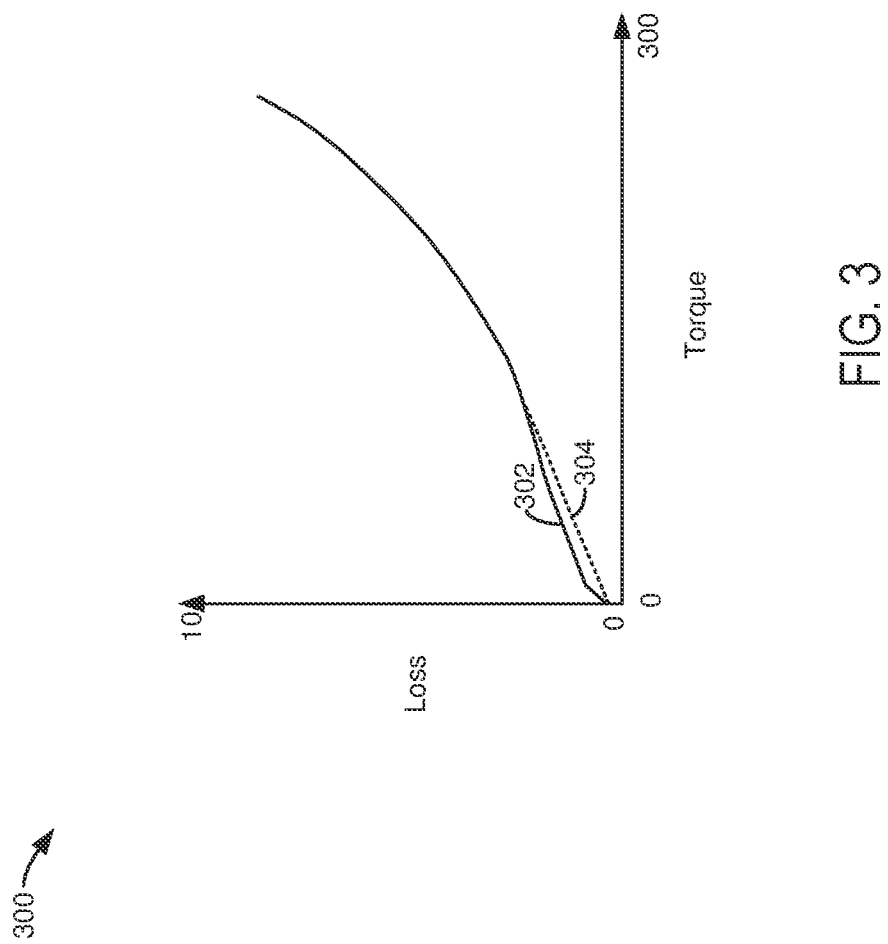
FIG. 3 is a plot that shows an electric machine operating region where losses of an electric machine may be lowered.

Referring now to FIG. 2, a block diagram 200 of a controller 112 that supplies a pulsed torque signal to an electric drive system that includes an electric machine is shown. The controller 112 includes a torque pulsation peak variation type module 202, a torque pulse peak variation method module 204, a torque pulsation peak parameters module 206, and a torque pulsation algorithm module 208. The torque pulsation peak variation type module 202, the torque pulse peak variation method module 204, the torque pulsation peak parameters module 206, and the torque pulsation algorithm module 208 may be comprised of executable instructions stored in non-transitory memory of controller 112.

The torque pulsation peak variation type module 202 contains logic to select which type of torque pulse peak torque is activated as a function of vehicle operating conditions (e.g., vehicle speed, driver demand torque, etc.). This logic allows different types of torque pulse peak torque variation for different vehicle operating conditions to optimize system losses, noise, and vibrations. For example, the torque pulse peak torque variation may be one of constant peak magnitude or variable torque pulse peak torque magnitude.

The torque pulse peak variation method module 204 includes a mapping between vehicle operating conditions and method by which the torque pulse peaks are varied. In one example, vehicle speed is input to a table or a function of empirically determined torque peak variation methods and the table or the function outputs the method by which torque pulse peaks are varied in the pulsed torque command. The methods for varying torque pulse peak variation may include, but are not limited to random peak variation, constant peak magnitudes, and time-varying torque pulse peaks. The varying torque pulse peaks allow system losses, noise, and vibration to be optimized for different electric drive system configurations over a wide range of operating conditions.

The torque pulsation peak parameters module 206 includes a mapping between vehicle operating conditions (e.g., vehicle speed and driver demand torque) and control parameters that define specific behaviors of toque pulsation peak variation. There may be different parameters for the type and method of torque pulsation peak variation. For example, for a constant torque pulsation peak, there is a parameter for torque pulse peak magnitude. For randomized torque pulsation peak variation, the parameters define a statistical distribution of the torque pulse peak. For sequential torque peak pulsation variation, the parameters may define the sequence by which torque pulsation peaks are output. Time-varying torque pulsation peaks parameters include parameters that define time-varying characteristics of the pulse peaks.

The torque pulsation algorithm module 208 modifies the driver demand torque request into a pulsed torque request or command. In one example, the pulsed torque request is generated via selecting a lower bound torque (e.g., zero), an upper bound torque (e.g., 100 Newton-meters), the frequency (e.g., which may be a function of electric machine speed), and the driver demand torque. A torque pulse period is determined via T=1/period, where T is the period in seconds. The percentage of the period when the torque pulse is equal to the upper bound torque may be determined via the following equation: time_high=T*(driver demand torque/upper bound torque). This equation may be modified slightly if the lower boundary torque is other than zero. The pulsed torque may then be generated by outputting a pulsed torque value that switches from the lower boundary torque value to the upper boundary torque value and back to the lower boundary torque value during a time of a period T. The pulsed torque value peak may be varied as a function of time, peak distribution characteristics, and other factors about the upper boundary torque value for an amount of time time_high. The pulsed torque is equal to the lower boundary torque value for a time T-time_high. The pulsed torque request (e.g., a signal that moves between the two boundary values without moving to intermediate values when switching between the two values as shown in FIG. 16) may be output to a space vector pulse width modulation motor controller 209 that operates electric machine 126. Space vector pulse width modulator motor controller 209 may be included in inverter system controller 134 or controller 112.

In this example, electric machine 126 is a three phase electric machine that is supplied with electric power via power inverter 224. The amounts of electric current that are supplied in each of the three phases is input to block 226 where Park and Clark transforms convert the electric currents from each of the three phases into a measured torque current $i_q$ and a measured flux current $i_d$. The measured flux current $i_d$ is subtracted from the commanded flux current $i_d$ at junction 214 (e.g., summing junction). The measured torque current $i_q$ is subtracted from the commanded torque current $i_q$ at junction 212 (e.g., summing junction). A pulsed torque request signal is input to current reference generator 210 and current reference generator 210 decomposes the pulsed torque request and outputs a commanded flux current $i_d$ and a commanded torque current $i_q$ to generate the commands that cause electric machine 126 to generate the average of the pulsed torque request, which is equivalent to the driver demand requested torque. Note that the driver demand requested torque may correspond to a torque output of the electric machine, a wheel torque, or an intermediate torque between electric machine torque and wheel torque. If the driver demand torque corresponds to a torque other that output torque of the electric machine, the commanded output torque for the electric machine may be compensated or adjusted for any gear ratio that may exist between the electric machine and the location in the vehicle propulsion system that corresponds to the driver demand torque.

A torque current proportional/integral controller 216 receives a torque current error from junction 212 and outputs a torque voltage $v_q$ command. Similarly, a flux current proportional/integral controller 218 receives a flux current error from junction 214 and outputs a flux voltage $v_d$ command. The torque voltage $v_q$ command and the flux voltage command $v_d$ are processed via an inverse Park transform at block 220 into a torque voltage in a rotating reference frame $v_d$ and a flux voltage in the rotating reference frame $v_\beta$. At block 222, the torque voltage in the rotating reference frame $v_d$ and the flux voltage in the rotating reference frame $v_\beta$ are converted into phase pulses via space vector pulse width modulation. The pulses operate the transistors or switches in the power inverter 224. The power inverter 224 outputs voltages for each of the phase windings of electric machine 126. The position of electric machine 126 is converted into an angle and the angle is supplied to blocks 220 and 226 for the inverse Park transform and the Park and Clark transforms.

Thus, a pulsed torque request may be converted into two electric current commands and the two electric current commands are converted into pulse width modulated pulses. The pulse width modulated pulses control the voltage that is supplied to electric machine 126.

Turning now to FIG. 3, a plot 300 of electric machine losses verses electric machine torque is shown. Plot 300 includes a vertical axis that represents losses of the electric machine and the amount of losses increases in the direction of the vertical axis arrow. The greater the loss value, the lower the electric machine efficiency. The horizontal axis represents torque output of the electric machine and torque output increases in the direction of the horizontal axis arrow. Solid line curve 302 represents losses of an electric machine when a torque request for the electric machine is not pulsed.

Dashed line 304 represents losses of the same electric machine when the torque request for the electric machine is pulsed. It may be observed that the torque losses for the electric machine are lower when the torque request is pulsed. Accordingly, there may be benefits to providing a pulsed torque request to an electric drive system.

Figure 4:
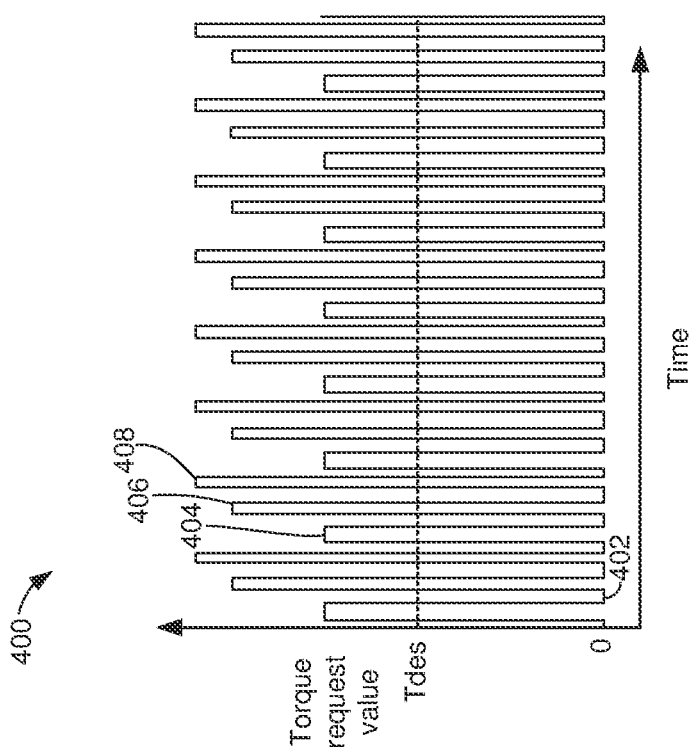

Moving on to FIG. 4, a plot 400 of how peak torque of a pulsed torque request for an electric machine may be varied as a function of time is shown. In this example, the pulsed torque request is generated in response to a constant driver demand torque request. Plot 400 includes a vertical axis that represents a torque request value of a pulsed torque request and the torque request value of the pulsed torque request increases in the direction of the vertical axis arrow. The horizontal axis represents time and time increases in the direction of the horizontal axis arrow. Solid line trace 402 that is comprised of a plurality of torque pulses of varying magnitude and it represents the pulsed torque request. In this example, the actual total number of torque pulse magnitudes is restricted to three, but in other examples, the torque pulse magnitudes may be restricted to a different value. Thus, an actual total number of three different torque pulse magnitudes (e.g., no more than and no less than three frequencies) may be a basis for generating a pulsed torque request. In this example, the three magnitudes are shown at 404, 406, and 408. The magnitudes of the torque pulses are the distances that extend from zero to the upper most levels shown at 404, 406, and 408. The average of the torque pulse request is equal to Tdes, and Tdes is equal to a constant driver demand torque. The torque pulses shown at 404, 406, and 408 are repeated in sequence from lowest to highest. The order of pulse output in the sequence and the magnitudes of the torque pulses may be design parameters for optimizing system losses, noise, and vibration.

Note that although solid line 402 extends between the torque lower bound value (e.g., zero) and peak values of individual torque pulses, intervening torque values between the lower bound and peak values are not included as values in the pulsed torque request. The pulsed torque request that is represented by solid line 402 contains only values of the lower bound and peak values for each torque pulse. The individual torque pulses include all of the non-lower bound values. Solid line 402 extends between the lower bound and peak torque pulse values to aid in following the trace.

Figure 5:
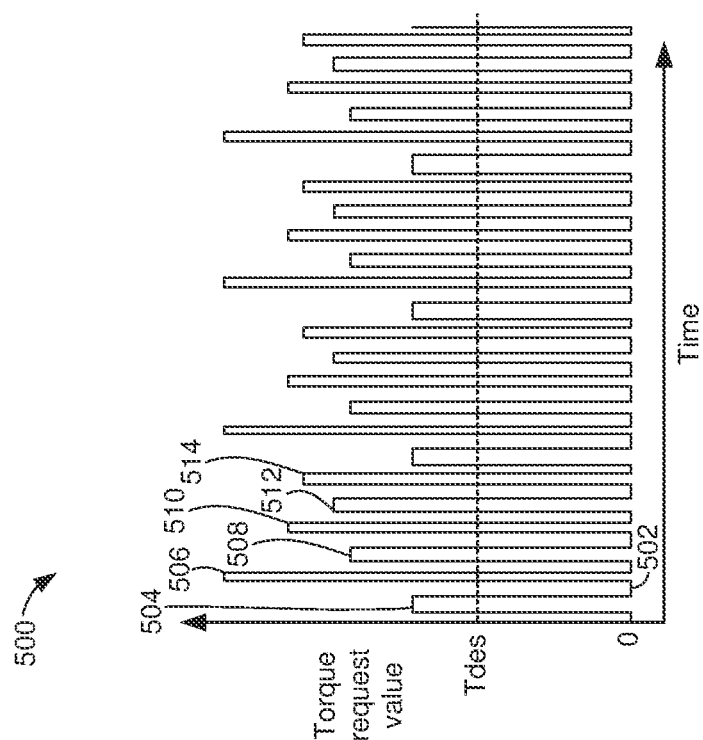

Referring now to FIG. 5, a second example plot 500 of how peak torque of a pulsed torque request for an electric machine may be varied as a function of time is shown. In this example, the pulsed torque request is generated in response to a constant driver demand torque request and the pulsed torque sequence is repeated with respect to time. Plot 500 includes a vertical axis that represents a torque request value of a pulsed torque request and the torque request value of the pulsed torque request increases in the direction of the vertical axis arrow. The horizontal axis represents time and time increases in the direction of the horizontal axis arrow. Solid line trace 502 that is comprised of a plurality of torque pulses of varying magnitude and it represents the pulsed torque request. In this example, the actual total number of torque pulse magnitudes is restricted to six. In this example, the six magnitudes are shown at 504-514. The magnitudes of the torque pulses are the distances that extend from zero to the upper most levels shown at 504-514. The average of the torque pulse request is equal to Tdes, and Tdes is equal to a constant driver demand torque. The torque pulses shown at 504-516 are repeated in sequence as a function of time. The order of pulse output in the sequence and the magnitudes of the torque pulses may be design parameters for optimizing system losses, noise, and vibration.

Note that although solid line 502 extends between the torque lower bound value (e.g., zero) and peak values of individual torque pulses, intervening torque values between the lower bound and peak values are not included as values in the pulsed torque request. The pulsed torque request that is represented by solid line 502 contains only values of the lower bound and peak values for each torque pulse. The individual torque pulses include all of the non-lower bound values. Solid line 502 extends between the lower bound and peak torque pulse values to aid in following the trace.

Figure 6:
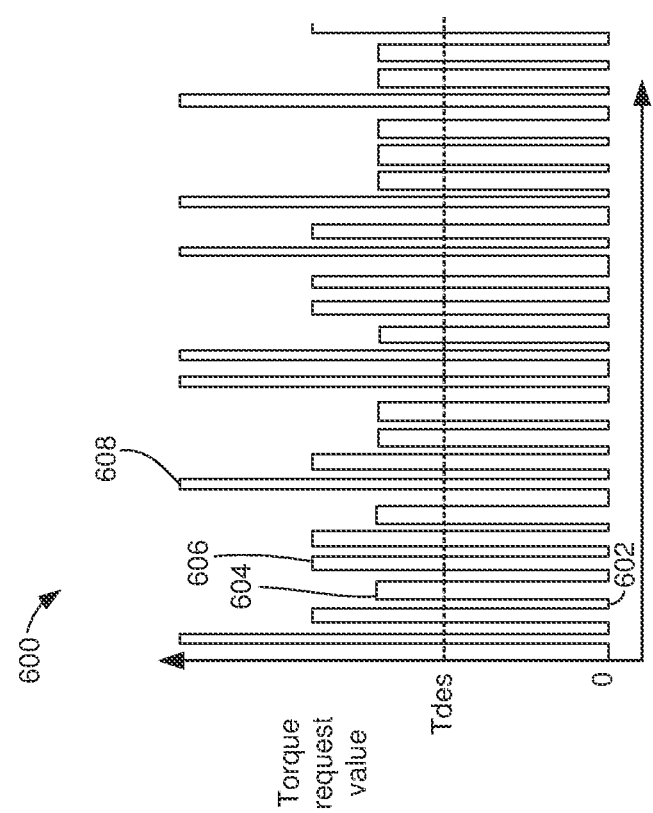

Referring now to FIG. 6, a third example plot 600 of how peak torque of a pulsed torque request for an electric machine may be varied as a function of time is shown. In this example, the pulsed torque request is generated in response to a constant driver demand torque request and the pulsed torque sequence is randomized with respect to time. Plot 600 includes a vertical axis that represents a torque request value of a pulsed torque request and the torque request value of the pulsed torque request increases in the direction of the vertical axis arrow. The horizontal axis represents time and time increases in the direction of the horizontal axis arrow. Solid line trace 602 that is comprised of a plurality of torque pulses of varying magnitude and it represents the pulsed torque request. In this example, the actual total number of torque pulse magnitudes is restricted to three. The three magnitudes are shown at 604-608. The average of the torque pulse request is equal to Tdes, and Tdes is equal to a constant driver demand torque. The torque pulses in the plot are random in magnitude as a function of time.

Note that although solid line 602 extends between the torque lower bound value (e.g., zero) and peak values of individual torque pulses, intervening torque values between the lower bound and peak values are not included as values in the pulsed torque request. The pulsed torque request that is represented by solid line 602 contains only values of the lower bound and peak values for each torque pulse. The individual torque pulses include all of the non-lower bound values. Solid line 602 extends between the lower bound and peak torque pulse values to aid in following the trace.

Figure 7:
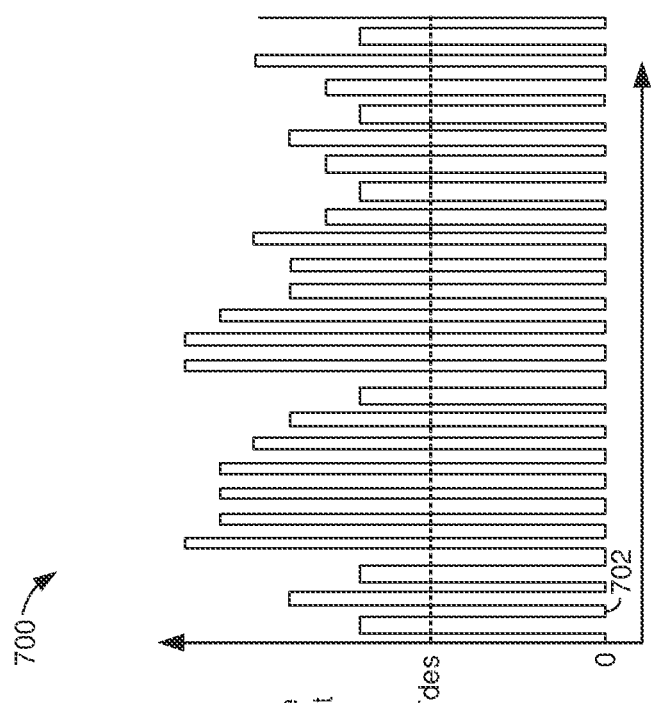

Referring now to FIG. 7, a fourth example plot 700 of how peak torque of a pulsed torque request for an electric machine may be varied as a function of time is shown. In this example, the pulsed torque request is generated in response to a constant driver demand torque request and the pulsed torque sequence is repeated with respect to time. Plot 700 includes a vertical axis that represents a torque request value of a pulsed torque request and the torque request value of the pulsed torque request increases in the direction of the vertical axis arrow. The horizontal axis represents time and time increases in the direction of the horizontal axis arrow. Solid line trace 702 that is comprised of a plurality of torque pulses of varying magnitude and it represents the pulsed torque request. The torque pulse magnitudes vary randomly as a function of time. In this example, the actual total number of torque pulse magnitudes is restricted to six. The average of the torque pulse request is equal to Tdes, and Tdes is equal to a constant driver demand torque.

Note that although solid line 702 extends between the torque lower bound value (e.g., zero) and peak values of individual torque pulses, intervening torque values between the lower bound and peak values are not included as values in the pulsed torque request. The pulsed torque request that is represented by solid line 702 contains only values of the lower bound and peak values for each torque pulse. The individual torque pulses include all of the non-lower bound values. Solid line 702 extends between the lower bound and peak torque pulse values to aid in following the trace.

Referring now to FIGS. 8-11, non-limiting example probability mass functions for the restricted magnitudes that may be a basis for generating a pulsed torque request are shown. The example probability mass functions may be a basis for controlling how often a particular magnitude in the group of restricted magnitudes is applied to generate the pulsed torque request. It may be desirable to apply different probability mass functions because particular magnitudes may be better or worse for lowering electric drive system losses.

Figure 8:
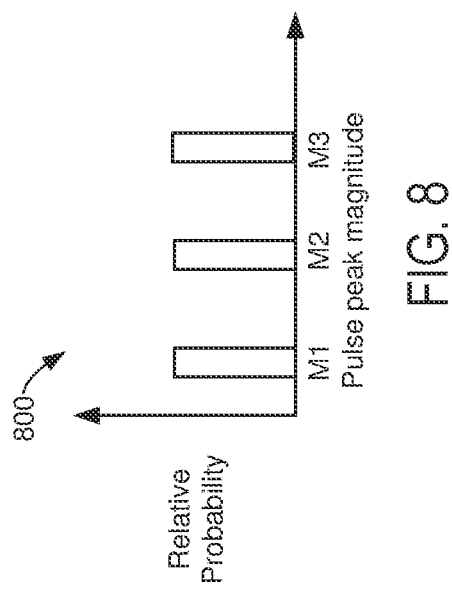

FIG. 8 shows a first example probability mass function 800. The vertical axis represents a relative probability that a particular torque pulse magnitude is applied to generate the pulsed torque request. The relative probability increases in the direction of the vertical axis arrow. The horizontal axis represents torque pulse magnitudes to generate the pulsed torque request. The torque pulse magnitude increases in the direction of the horizontal axis arrow.

In this example, the torque pulse magnitudes are restricted to three values (M1, M2, and M3) and the magnitude interval between the three magnitudes is evenly distributed. Thus, the probability mass distribution shows three equally distributed magnitudes with equal probability.

Figure 9:
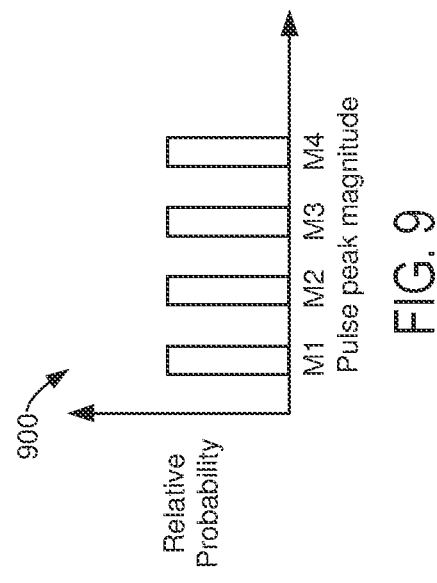

FIG. 9 shows a second example probability mass function 900. The vertical axis represents a relative probability that a particular magnitude is applied to generate the pulsed torque request. The relative probability increases in the direction of the vertical axis arrow. The horizontal axis represents magnitude s to generate the pulsed torque request. The magnitude increases in the direction of the horizontal axis arrow.

In this example, the magnitude s are restricted to four values (M1, M2, M3, and M4) and the magnitude interval between the four frequencies is evenly distributed. Thus, the probability mass distribution shows four equally distributed frequencies with equal probability.

Figure 10:
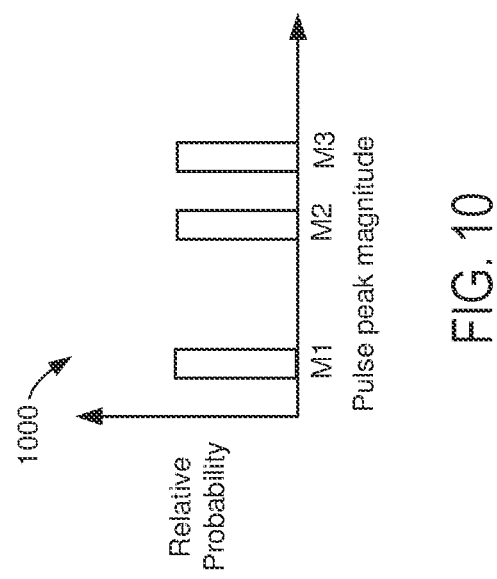

FIG. 10 shows a third example probability mass function 1000. The vertical axis represents a relative probability that a particular magnitude is applied to generate the pulsed torque request. The relative probability increases in the direction of the vertical axis arrow. The horizontal axis represents magnitudes to generate the pulsed torque request. The magnitude increases in the direction of the horizontal axis arrow.

In this example, the magnitudes are restricted to four values (M1, M2, and M3) and the magnitude interval between the three frequencies is unevenly distributed. Thus, the probability mass distribution shows three unequally distributed frequencies with equal probability.

Figure 11:
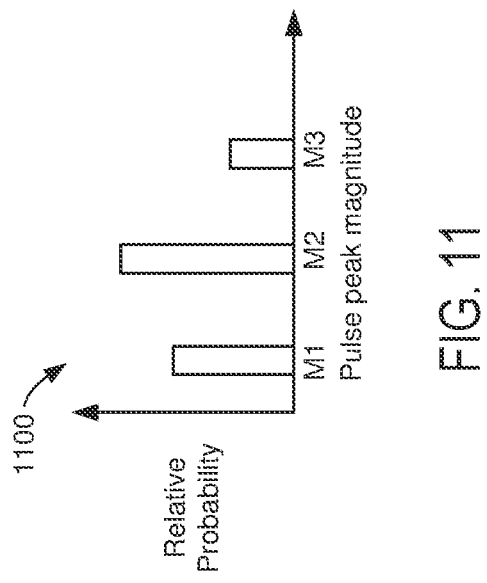

FIG. 11 shows a fourth example probability mass function 1100. The vertical axis represents a relative probability that a particular magnitude is applied to generate the pulsed torque request. The relative probability increases in the direction of the vertical axis arrow. The horizontal axis represents magnitudes to generate the pulsed torque request. The magnitude increases in the direction of the horizontal axis arrow.

In this example, the magnitudes are restricted to three values (M1, M2, and M3) and the magnitude interval between the three magnitudes is evenly distributed. However, in this example, the probability of selecting M3 is lowered and the probability of selecting M2 is increased. Thus, the probability mass distribution shows three equally distributed frequencies with unequal probability.

Referring now to FIG. 12, an example plot 1200 of how peak torque of a pulsed torque request for an electric machine may be varied as a function of time is shown. In this example, the pulsed torque request is generated in response to a constant driver demand torque request, and the pulsed torque values are selected randomly from a predetermined range of values with respect to time. Plot 1200 includes a vertical axis that represents a torque request value of a pulsed torque request and the torque request value of the pulsed torque request increases in the direction of the vertical axis arrow. The horizontal axis represents time and time increases in the direction of the horizontal axis arrow. Solid line trace 1202 that is comprised of a plurality of torque pulses of varying magnitude and it represents the pulsed torque request. The magnitudes of the torque pulses are the distances that extend from the lower bound (e.g., zero) to the peak or maximum values of the pulses. The pulses include all non-lower bound values. The average of the torque pulse request is equal to Tdes, and Tdes is equal to a constant driver demand torque.

Note that although solid line 1202 extends between the torque lower bound value (e.g., zero) and peak values of individual torque pulses, intervening torque values between the lower bound and peak values are not included as values in the pulsed torque request. The pulsed torque request that is represented by solid line 1202 contains only values of the lower bound and peak values for each torque pulse. The individual torque pulses include all of the non-lower bound values. Solid line 1202 extends between the lower bound and peak torque pulse values to aid in following the trace.

With regard to FIG. 13, another example plot 1300 of how peak torque of a pulsed torque request for an electric machine may be varied as a function of time is shown. In this example, the pulsed torque request is generated in response to a constant driver demand torque request, and the pulsed torque values are selected randomly from a predetermined range of values with respect to time. Plot 1300 includes a vertical axis that represents a torque request value of a pulsed torque request and the torque request value of the pulsed torque request increases in the direction of the vertical axis arrow. The horizontal axis represents time and time increases in the direction of the horizontal axis arrow. Solid line trace 1302 that is comprised of a plurality of torque pulses of varying magnitude and it represents the pulsed torque request. The magnitudes of the torque pulses are the distances that extend from the lower bound (e.g., zero) to the peak or maximum values of the pulses. The pulses include all non-lower bound values. The average of the torque pulse request is equal to Tdes, and Tdes is equal to a constant driver demand torque.

Note that although solid line 1302 extends between the torque lower bound value (e.g., zero) and peak values of individual torque pulses, intervening torque values between the lower bound and peak values are not included as values in the pulsed torque request. The pulsed torque request that is represented by solid line 1302 contains only values of the lower bound and peak values for each torque pulse. The individual torque pulses include all of the non-lower bound values. Solid line 1302 extends between the lower bound and peak torque pulse values to aid in following the trace.

Referring now to FIGS. 14-17, non-limiting example probability distribution functions for the torque pulse magnitudes that may be a basis for generating a pulsed torque request are shown. The example probability distribution functions may be a basis for controlling how often a particular magnitude in the group of restricted magnitudes is applied to generate the pulsed torque request. It may be desirable to apply different probability distribution functions because particular frequencies may be better or worse for lowering electric drive system losses.

FIG. 14 shows a first example probability distribution function. The vertical axis represents a relative probability density that a particular frequency is applied to generate the pulsed torque request. The relative probability density increases in the direction of the vertical axis arrow. The horizontal axis represents frequencies to generate the pulsed torque request. The pulse frequency increases in the direction of the horizontal axis arrow.

In this example, the pulse magnitudes are not restricted and the probability distribution is of a uniform type. Trace 1402 illustrates a type of probability distribution (uniform) that is applied to generate the pulsed torque request may be based on vehicle operating conditions (e.g., vehicle speed and driver demand torque) and probability distribution types may be retrieved from a look-up table or function that is referenced via the vehicle operating conditions.

FIG. 15 shows a second example probability distribution function. The vertical axis represents a relative probability density that a particular torque pulse magnitude is applied to generate the pulsed torque request. The relative probability density increases in the direction of the vertical axis arrow. The horizontal axis represents torque pulse magnitudes to generate the pulsed torque request. The pulse magnitude increases in the direction of the horizontal axis arrow.

In this example, the pulse magnitudes are not restricted and the probability distribution is of a normal type. Trace 1502 illustrates a type of probability distribution (normal) that is applied to generate the pulsed torque request may be based on vehicle operating conditions (e.g., vehicle speed and driver demand torque) and probability distribution types may be retrieved from a look-up table that is referenced via the vehicle operating conditions.

FIG. 16 shows a third example probability distribution function. The vertical axis represents a relative probability density that a particular torque pulse magnitude is applied to generate the pulsed torque request. The relative probability density increases in the direction of the vertical axis arrow. The horizontal axis represents torque pulse magnitudes to generate the pulsed torque request. The pulse magnitude increases in the direction of the horizontal axis arrow.

In this example, the pulse magnitudes are not restricted and the probability distribution is of a bimodal type. Trace 1602 illustrates a type of probability distribution (bimodal) that is applied to generate the pulsed torque request may be based on vehicle operating conditions (e.g., vehicle speed and driver demand torque) and probability distribution types may be retrieved from a look-up table that is referenced via the vehicle operating conditions.

FIG. 17 shows a second example probability distribution function. The vertical axis represents a relative probability density that a particular torque pulse magnitude is applied to generate the pulsed torque request. The relative probability density increases in the direction of the vertical axis arrow. The horizontal axis represents torque pulse magnitudes to generate the pulsed torque request. The pulse magnitude increases in the direction of the horizontal axis arrow.

In this example, the pulse magnitudes are not restricted and the probability distribution is of an exponential type. Trace 1702 illustrates a type of probability distribution (exponential) that is applied to generate the pulsed torque request may be based on vehicle operating conditions (e.g., vehicle speed and driver demand torque) and probability distribution types may be retrieved from a look-up table that is referenced via the vehicle operating conditions.

Figure 18:
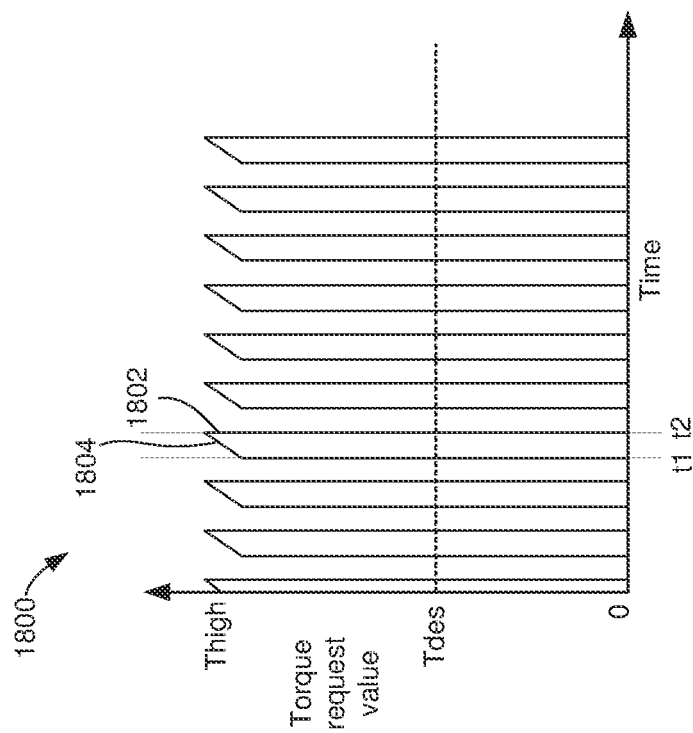

Referring now to FIG. 18, an example plot 1800 of how peak torque of a pulsed torque request for an electric machine may be varied as a function of time is shown. In this example, the pulsed torque request is generated in response to a constant driver demand torque request. Plot 1800 includes a vertical axis that represents a torque request value of a pulsed torque request and the torque request value of the pulsed torque request increases in the direction of the vertical axis arrow. The horizontal axis represents time and time increases in the direction of the horizontal axis arrow. Solid line 1802 that is comprised of a plurality of torque pulses including a magnitude that linearly increases within each individual torque pulse and solid line 1802 represents the pulsed torque request. The magnitudes of the torque pulses are the lines that are on an angle (e.g., 1804) within the individual torque pulses. The individual pulses include all non-lower bound values. The average of the torque pulse request is equal to Tdes, and Tdes is equal to a constant driver demand torque.

Note that although solid line 1802 extends between the torque lower bound value (e.g., zero) and values of individual torque pulses that increase linearly (e.g., between time t1 and time t2), intervening torque values between the lower bound and linearly increasing values are not included as values in the pulsed torque request. The pulsed torque request that is represented by solid line 1802 contains only values of the lower bound and linearly increasing values for each torque pulse. The individual torque pulses include all of the non-lower bound values. Solid line 1802 extends between the lower bound and linear increasing torque pulse values to aid in following the trace.

Figure 19:
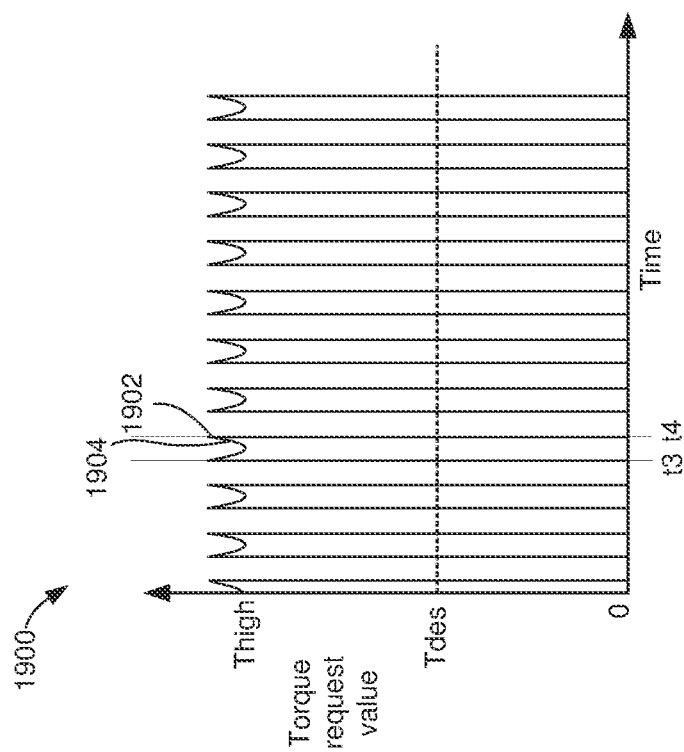

Referring now to FIG. 19, another example plot 1900 of how peak torque of a pulsed torque request for an electric machine may be varied as a function of time is shown. In this example, the pulsed torque request is generated in response to a constant driver demand torque request. Plot 1900 includes a vertical axis that represents a torque request value of a pulsed torque request and the torque request value of the pulsed torque request increases in the direction of the vertical axis arrow. The horizontal axis represents time and time increases in the direction of the horizontal axis arrow. Solid line 1902 that is comprised of a plurality of torque pulses including a magnitude that changes non-linearly within each individual torque pulse and solid line 1902 represents the pulsed torque request. The magnitudes of the torque pulses are the lines that within the pulses (e.g., 1904). The individual pulses include all non-lower bound values. The average of the torque pulse request is equal to Tdes, and Tdes is equal to a constant driver demand torque.

Note that although solid line 1902 extends between the torque lower bound value (e.g., zero) and values of individual torque pulses that change non-linearly (e.g., between time t3 and time t4), intervening torque values between the lower bound and non-linear values are not included as values in the pulsed torque request. The pulsed torque request that is represented by solid line 1902 contains only values of the lower bound and non-linear values for each torque pulse. The individual torque pulses include all of the non-lower bound values. Solid line 1902 extends between the lower bound and non-linear torque pulse values to aid in following the trace.

Figure 20:
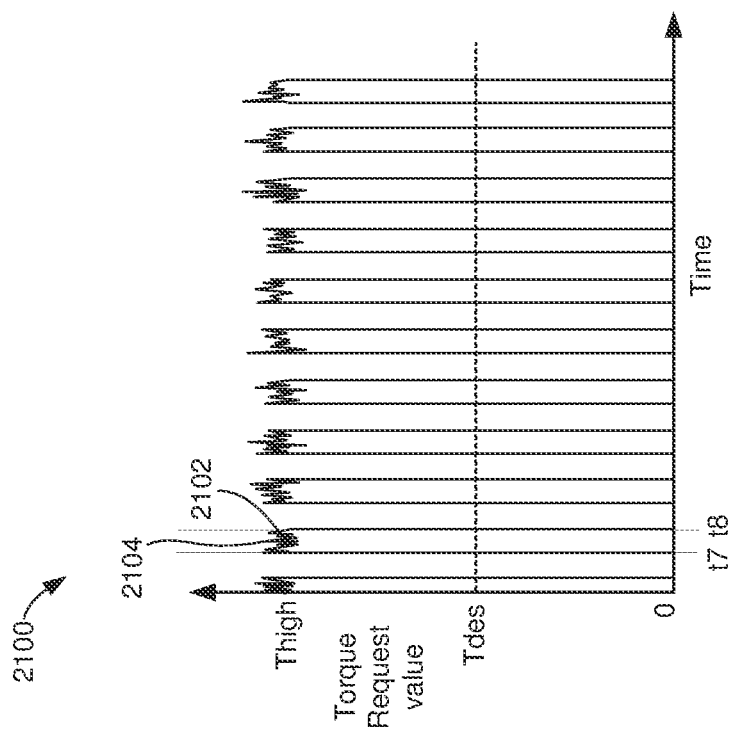

Referring now to FIG. 20, another example plot 2000 of how peak torque of a pulsed torque request for an electric machine may be varied as a function of time is shown. In this example, the pulsed torque request is generated in response to a constant driver demand torque request. Plot 2000 includes a vertical axis that represents a torque request value of a pulsed torque request and the torque request value of the pulsed torque request increases in the direction of the vertical axis arrow. The horizontal axis represents time and time increases in the direction of the horizontal axis arrow. Solid line 2002 that is comprised of a plurality of torque pulses including a magnitude that changes harmonically within each individual torque pulse and solid line 2002 represents the pulsed torque request. The magnitudes of the torque pulses are the lines that within the pulses (e.g., 2004). The individual pulses include all non-lower bound values. The average of the torque pulse request is equal to Tdes, and Tdes is equal to a constant driver demand torque.

Note that although solid line 2002 extends between the torque lower bound value (e.g., zero) and values of individual torque pulses that change harmonically (e.g., between time t5 and time t6), intervening torque values between the lower bound and harmonic values are not included as values in the pulsed torque request. The pulsed torque request that is represented by solid line 2002 contains only values of the lower bound and harmonic values for each torque pulse. The individual torque pulses include all of the non-lower bound values. Solid line 2002 extends between the lower bound and harmonic torque pulse values to aid in following the trace.

Figure 21:
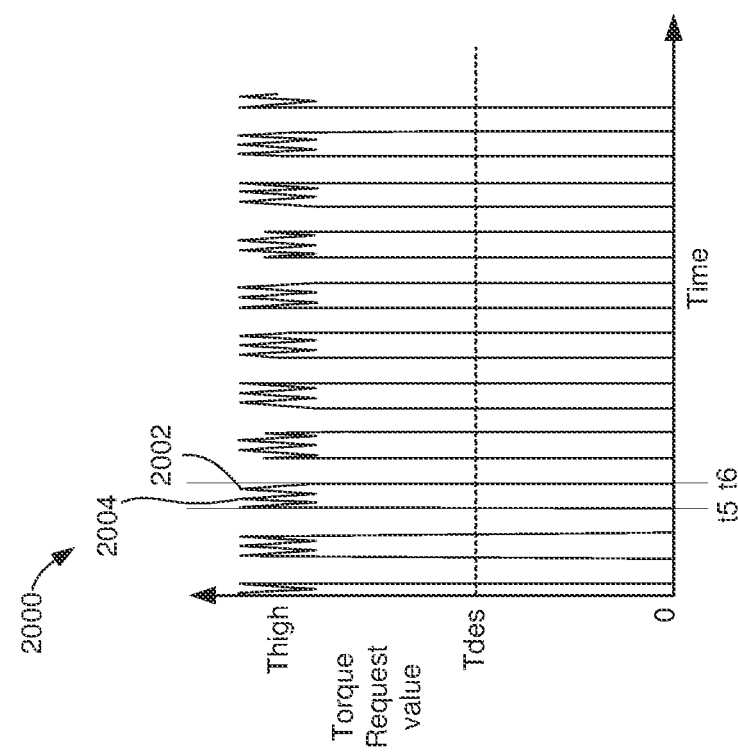

Referring now to FIG. 21, another example plot 2100 of how peak torque of a pulsed torque request for an electric machine may be varied as a function of time is shown. In this example, the pulsed torque request is generated in response to a constant driver demand torque request. Plot 2100 includes a vertical axis that represents a torque request value of a pulsed torque request and the torque request value of the pulsed torque request increases in the direction of the vertical axis arrow. The horizontal axis represents time and time increases in the direction of the horizontal axis arrow. Solid line 2102 that is comprised of a plurality of torque pulses including a magnitude that changes randomly within each individual torque pulse and solid line 2102 represents the pulsed torque request. The magnitudes of the torque pulses are the lines that within the pulses (e.g., 2104). The individual pulses include all non-lower bound values. The average of the torque pulse request is equal to Tdes, and Tdes is equal to a constant driver demand torque.

Note that although solid line 2102 extends between the torque lower bound value (e.g., zero) and values of individual torque pulses that change non-linearly (e.g., between time t7 and time t8), intervening torque values between the lower bound and random values are not included as values in the pulsed torque request. The pulsed torque request that is represented by solid line 2102 contains only values of the lower bound and random values for each torque pulse. The individual torque pulses include all of the non-lower bound values. Solid line 2102 extends between the lower bound and random torque pulse values to aid in following the trace.

Referring to FIG. 22, a flowchart of a method for generating a pulsed torque command for an electric machine is shown. The method of FIG. 22 may be at least partially implemented as executable instructions stored in controller memory in the systems of FIG. 1. Further, the method of FIG. 22 may include actions taken in the physical world to transform operating states of the system of FIG. 1. In addition, in some examples, the method of FIG. 22 may be distributed amongst several controllers where each controller performs a portion of the method. Method 2200 may execute when a vehicle is operating at predetermined conditions (e.g., a particular speed and driver demand torque range).

At 2202, method 2200 receives vehicle operating conditions. Vehicle operating conditions may include, but are not limited to vehicle speed and driver demand torque. Driver demand torque may be determined from a position of a driver demand pedal and vehicle speed. Method 2200 proceeds to 2204.

At 2204, method 2200 determines peak torque values that are a basis for generating the pulsed torque request or command. In one example, method 2200 references a table or function according to vehicle operating conditions and the table or function outputs peak torque values as shown in FIGS. 4-7, 12, 13, and 18-21. The peak torque request values may be empirically determined by operating an electric machine and adjusting peak torque command values to achieve a desired level of electric drive system losses. The peak torque values may be bounded or constrained to a range of magnitudes via an upper magnitude bound and a lower magnitude bound. Method 2200 proceeds to 2206.

At 2206, method 2200 converts the driver demand torque request into a pulsed torque request or command. The pulsed torque request is a function of time. In one example, the pulsed torque request is generated via a function that has inputs including driver demand torque request and requested pulsation frequency as output from block 208 of FIG. 2. The pulsed torque request may be generated as previously discussed. Method 2200 proceeds to 2208.

At 2208, method 2200 processes the pulsed torque request into pulse width modulated signals and drives an electric machine via the pulse width modulated signals. The electric machine generates an average torque that is substantially equal to the driver demand torque or the driver demand torque modified according to a location in a driveline where the driver demand torque is requested (e.g., a wheel torque). Method 2200 proceeds to exit.

In this way, method 2200 converts a driver demand request into a pulsed torque request and commands an electric machine to follow the pulsed torque requested. The pulsed torque request may be generated based on one or more peak torque magnitudes. The peak torque values may cause noise and vibrations from an electric drive system to be lowered.

The method of FIG. 22 provides for a method for operating an electric drive system, comprising: generating a pulsed torque request that includes pulses of torque with at least two different magnitudes in response to a constant driver demand torque request; and generating a torque that on average corresponds to the constant driver demand torque request via an electric machine in response to the pulsed torque request. In a first example, the method includes where the pulsed torque request is comprised of a plurality of torque request pulses, and where pulses included in the plurality of torque pulses include a first torque request value that is within a threshold value of zero torque and an absence of torque request values that are between the first torque request value and a second torque request value. In a second example that may include the first example, the method includes where the threshold value is less than five percent of a maximum torque of the electric machine. In a third method that may include one or both of the first and second methods, the method includes where the second torque request value is greater than the constant driver demand torque request. In a third example that may include one or both of the first and second example, the method includes where the pulsed torque request includes a first torque pulse having a first maximum torque value that is greater than a second maximum torque value of a second torque pulse included in the pulsed torque request. In a fourth example that may include one or more of the first through third examples, the method includes where the pulsed torque request includes a third torque pulse having a third maximum torque value that is less than a second maximum torque value of the second torque pulse included in the pulsed torque request. In a fifth example that may include one or more of the first through fourth examples, the method includes where the pulsed torque request includes torque pulses having a first maximum torque value, torque pulses having a second maximum torque value, and torque pulses having a third maximum torque value. In a sixth example that may include one or more of the first through fifth examples, the method includes where the first maximum torque value, the second maximum torque value, and the third maximum torque value are randomly chosen as a function of time from a predetermined group of values.

The method of FIG. 22 also provides for a method for operating an electric drive system, comprising: generating a pulsed torque request that varies in magnitude within pulses of the pulsed torque request, and where the pulses begin at a first value and are greater in magnitude than a second value when the magnitude within the pulses is varied; and generating a torque that on average corresponds to the driver demand torque request via an electric machine in response to the pulsed torque request. In a first example, the method includes where the first value is less than five percent of a maximum torque output of the electric machine. In a second example that may include the first example, the method includes where the second value is greater than the driver demand torque request. In a third example that may include one or both of the first and second examples, the method includes where varying magnitude within pulses includes increasing magnitude with a pulse of the pulsed torque request. In a fourth example that may include one or more of the first through third example, the method includes where varying magnitude within pulses includes randomly adjusting magnitude with a pulse of the pulsed torque request.

Finally, FIG. 23 shows how an example pulsed torque request may be generated. Plot 2300 includes a vertical axis and a horizontal axis. The vertical axis represents a torque request value (e.g., 0-600 Newton-meters) and the torque request value increases in the direction of the vertical axis arrow. The horizontal axis represents time and time increases from the left side of the figure to the right side of the figure.

In this example, the pulsed torque request is either one of two values. Namely, the pulsed torque request value is the lower bound (e.g., zero) or the upper bound (e.g., Thigh). The average pulsed torque is equal to Tdes, which is equal to a constant driver demand torque that is being requested. The pulsed torque request is comprised of individual values that are indicated via dots that are similar to dot 2302 and dot 2304. The line that links the dots is provided to visually improve the plot, not to indicate that there are any intermediate torque values between 0 and Thigh because there are none. These individual values may be updated at a predetermined rate via the controller to permit generation of a pulse torque request at a desired frequency. The torque pulse request traces shown herein show a line between the lower bound values and values in the pulses (e.g., non-lower bound values). The line is not to be understood as showing intermediate torque values between lower bound values and values in the respective torque pulses. It may be appreciated that the lower bound values described herein may be other than zero.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating an electric drive system, comprising:
   generating a pulsed torque request that includes pulses of torque with at least two different magnitudes in response to a constant driver demand torque request, wherein the pulsed torque request includes torque pulses having a first maximum torque value, torque pulses having a second maximum torque value, and torque pulses having a third maximum torque value that are randomly chosen as a function of time from a predetermined group of values; and
   generating torque that on average corresponds to the constant driver demand torque request via an electric machine in response to the pulsed torque request.

2. The method of claim 1, where the pulsed torque request is comprised of a plurality of torque request pulses, and where pulses included in the plurality of torque request pulses include a first torque request value that is within a threshold value of zero torque and an absence of torque request values that are between the first torque request value and a second torque request value.

3. The method of claim 2, where the threshold value is less than five percent of a maximum torque of the electric machine.

4. The method of claim 3, where the second torque request value is greater than the constant driver demand torque request.

5. The method of claim 1, where the pulsed torque request includes a first torque pulse having a first maximum torque value that is greater than a second maximum torque value of a second torque pulse included in the pulsed torque request.

6. The method of claim 5, where the pulsed torque request includes a third torque pulse having a third maximum torque value that is less than the second maximum torque value of the second torque pulse included in the pulsed torque request.

7. A system, comprising:
an electric drive system including an inverter and an electric machine; and
a controller including executable instructions stored in non-transitory memory that cause the controller to generate a pulsed torque request that varies maximum magnitudes of torque pulses in the pulsed torque request as a function of time in response to a constant driver demand torque request; and
propel a vehicle with a torque generated by the electric drive system in response to the pulsed torque request.

8. The system of claim 7, where the torque pulses increase from a first torque value to torque values greater than a second torque value, and where the second torque value is greater than the constant driver demand torque request.

9. The system of claim 8, where the torque pulses return to the first torque value after reaching the torque values greater than the second torque value.

10. The system of claim 7, where the maximum magnitudes of torque pulses are randomly selected from a group of predetermined values.

11. The system of claim 7, where the maximum magnitudes of torque pulses are randomly selected from a range of predetermined values.

12. The system of claim 7, further comprising additional executable instructions that cause the controller to adjust a probability of torque values to vary maximum magnitudes of the torque pulses.

13. A method for operating an electric drive system, comprising:
generating a pulsed torque request that varies in magnitude within pulses of the pulsed torque request, and
where the pulses begin at a first value and are greater in magnitude than a second value when the magnitude within the pulses is varied,
where varying magnitude within pulses includes randomly adjusting magnitude with a pulse of the pulsed torque request; and
generating a torque that on average corresponds to a driver demand torque request via an electric machine in response to the pulsed torque request.

14. The method of claim 13, where the first value is less than five percent of a maximum torque output of the electric machine.

15. The method of claim 14, where the second value is greater than the driver demand torque request.

16. The method of claim 13, where varying magnitude within pulses includes increasing magnitude with a pulse of the pulsed torque request.

* * * * *